United States Patent [19]

Brendle

[11] 4,167,510
[45] Sep. 11, 1979

[54] ESTER CAPPED ALKYLENEOXY FUGITIVE TINTS AND METHOD FOR PRODUCING SAME

[75] Inventor: Ralph N. Brendle, Inman, S.C.

[73] Assignee: Milliken Research Corporation, Spartanburg, S.C.

[21] Appl. No.: 871,719

[22] Filed: Jan. 23, 1978

Related U.S. Application Data

[63] Continuation-in-part of Ser. No. 720,685, Sep. 7, 1976, abandoned.

[51] Int. Cl.$^2$ .................. C09B 1/32; C09B 29/08; C09B 43/18; D06P 3/00
[52] U.S. Cl. ...................... 260/174; 8/164; 260/160; 260/164; 260/178; 260/184; 260/187; 260/205; 260/206; 260/207; 260/207.1; 260/207.5; 260/374; 260/378; 260/393; 260/394; 260/404; 260/507 R; 260/573; 260/945; 562/606
[58] Field of Search .................. 260/160, 200, 207.5, 260/206, 207, 207.1, 174, 178, 184, 187, 393, 394, 374, 378; 8/164

[56] References Cited

U.S. PATENT DOCUMENTS

| | | | |
|---|---|---|---|
| 3,022,335 | 2/1962 | Lundsted | 260/485 |
| 3,101,774 | 8/1963 | Patton | 260/584 B |
| 3,157,633 | 11/1964 | Kuhn | 260/200 |
| 3,206,511 | 9/1965 | Bindler et al. | 260/570.6 |
| 3,337,525 | 8/1967 | Peters et al. | 260/200 |
| 3,449,319 | 6/1969 | Kuhn | 260/207.5 |
| 3,507,850 | 4/1970 | Cohen et al. | 260/160 |

FOREIGN PATENT DOCUMENTS 4623793 3/1968 Japan .......................... 8/164

*Primary Examiner*—Floyd D. Higel
*Attorney, Agent, or Firm*—H. William Petry

[57] ABSTRACT

Improved fugitive tints are provided wherein such tints are characterized as having from 2 to about 300 repeating alkyleneoxy capped units in the molecule and having a dyestuff molecule attached to the alkyleneoxy capped units. The solubility of the tint compositions can be altered by varying the number of alkyleneoxy capped units in the tint molecule. The fugitive tints are characterized by the formula

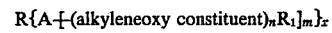

wherein R—A is an organic dyestuff molecule, A is a linking moiety in said organic dyestuff molecule selected from the group consisting of N, O, S, or $CO_2$, the alkylene moiety of the alkyleneoxy constituent contains from 2 to about 4 carbon atoms, n is an integer of from 2 to about 300, m is 1 when A is O, S, or $CO_2$ and 2 when A is N, x is an integer of from 1 to about 5, and the product of n times m times x (n·m·x) is from 2 to about 300, and $R_1$ is

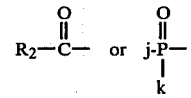

and sulfonates and sulfates thereof in which $R_2$ is H, OH, an alkyl moiety containing up to 20 carbon atoms or an alkyl substituted carbonyl moiety containing up to 20 carbon atoms, j and k are OH, OM or $OR_3$ wherein M is a cation moiety of an alkali metal, an alkaline earth metal or ammonia and $R_3$ is an alkyl moiety containing up to 20 carbon atoms.

6 Claims, No Drawings

ESTER CAPPED ALKYLENEOXY FUGITIVE TINTS AND METHOD FOR PRODUCING SAME

This application is a continuation-in-part of my copending application entitled "CAPPED ALKYLENEOXY FUGITIVE TINTS AND METHOD FOR PRODUCING SAME" U.S. Ser. No. 720,685, filed Sept. 7, 1976, now abandoned.

This invention relates to fugitive tints. In one aspect it relates to novel fugitive tints and to methods for their preparation.

Fugitive tints are often used to color code textiles during production and/or finishing operations to identify certain synthetic or natural fibers. For example, the fibers may be tinted during the spinning of the fibers into yarns and the utilization of the yarns in knitting or weaving operations to ensure that undesirable fibers or yarns are not present. Such tints are then removed during one of the last finishing operations prior to sale. To be acceptable, a fugitive tint should be capable of being easily removed, even after exposure to extreme conditions which might be encountered during the production and finishing of the textile. Also, the tint should have good color stability to minimize fading during exposure to heat and/or light, conditions which may be encountered during processing of the tinted fibers into the final product.

Heretofore, fugitive tints have generally been classified as water fugitive or solvent fugitive. For example, dyestuffs containing one or more polyethyleneoxy groups wherein the polyethyleneoxy group contained at least 30 repeating ethyleneoxy units in the molecule are generally considered water fugitive tints; whereas, dyestuffs containing one or more polypropyleneoxy groups having similar repeating propyleneoxy units in the molecule are considered solvent fugitive. Thus, the choice of tints have depended largely upon the finishing operations of the fiber and the fugitivity properties of the tint.

Fugitive tints which have achieved wide acceptance in the textile industry are the polyethylene oxide tints described in U.S. Pat. No. 3,157,663. Such tints are a combination of a dyestuff radical and one or more polyethyleneoxy groups. Dyestuff radicals disclosed in the patent include nitroso, nitro, azo, diphenylmethane, triphenylmethane, xanthene, acridene, methine, thiazole, indamine, azine, oxazine, or anthraquinone radicals. Preferably, such radicals are attached to the polymeric constituents of the tint compositions by an amino nitrogen.

Another type of fugitive tint which has achieved acceptance in the textile industry is the alkaline stable fugitive tint of the triphenylmethane type as described in U.S. Pat. No. 3,927,044. Such fugitive tints have, in addition to application in the textile industry, application as colorants of soaps and detergents because of, in addition to their fugitivity properties, their alkaline stability.

While many of the prior art tints have been widely accepted, new and improved tint compositions are constantly being sought, especially tint compositions in which the fugitive solubility characteristics can readily be modified without severely altering the molecular structure of the dyestuff radical. Further, it is desirable that new and improved methods for producing fugitive tint compositions having variable solubility be found which do not require expensive and time consuming alterations in the process or method for producing such tint compositions.

It is, therefore, an object of the invention to provide improved fugitive tint compositions.

Another object of the invention is to provide improved fugitive tint compositions in which the fugitive and solubility characteristics of such compositions can readily be modified.

Another object of the invention is to provide an improved method for producing fugitive tint compositions having varied fugitive and solubility characteristics.

These and other objects of the invention will become apparent to those skilled in the art from the reading of the following detailed description.

The novel fugitive tints of the present invention comprise an organic dyestuff molecule having from 1 to 5 capped alkyleneoxy units wherein the total alkyleneoxy capped units in the molecule are from 2 to about 300. The alkylene moiety of the alkyleneoxy units contains from about 2 to 4 carbon atoms and the tints of the invention can be made water and/or organic solvent soluble depending upon the particular capping moiety employed, the presence or absence of at least one ionic group and the total number of alkyleneoxy units present in the tint molecule. The solubility, and thus the fugitivity of the tints of the present invention, is achieved irrespective of whether the relatively large dyestuff molecule is hydrophobic or hydrophilic.

The ionic group previously mentioned can be present in either the capping moiety, the dyestuff radical, or a combination thereof. The term ionic group as used herein is to be understood to mean any set of any moiety having a pk value of less than about 3. Typical of such ionic groups are the sulfonates, phosphates, and sulfates of alkali metal salts, alkaline earth metal salts, amine salts, ammonia salts and the like.

Further, it should be noted that alkyleneoxy copolymers, such as ethyleneoxy-propyleneoxy copolymers, ethyleneoxy-butyleneoxy copolymers, block copolymers thereof or graph copolymers can be employed as the alkyleneoxy constituent of the fugitive tints of the present invention. When employing an ethyleneoxy-propyleneoxy copolymer, the ethyleneoxy units generally will comprise from about 25 to about 75 mole percent of the polymer chains with the propyleneoxy units being the remainder.

The term water soluble and/or fugitive as used herein is to be understood to mean that the tint is substantially soluble in water and can be substantially removed by washing the tinted fiber or fabric with water. The term "water and organic solvent soluble and/or fugitive" is to be understood that the tint is substantially soluble in water or an organic solvent and can be removed from the fiber by washing the tinted fiber in water or an organic solvent. Organic solvents which may be employed to treat the tinted fibers are well known in the art and include hydrocarbons, such as mineral oil, and organic solvents such as perchloroethylene, carbon tetrachloride and the like.

Important fugitive tints of the present invention are characterized by the general formula $R\{A\text{-}[(\text{alkyleneoxy constituent})_n R_1]_m\}_x$ wherein RA organic dyestuff molecule, A is a linking moiety in said organic dyestuff molecule selected from the group consisting of N, O, S or $CO_2$, the alkylene moiety of the alkyleneoxy constituent contains from 2 to about 4 carbon atoms, n is an integer of from 2 to about 300, m is 1 when A is O, S, $CO_2$ and 2 when A is N x is an integer of from 1 to 5, and the product of n times x times m (n·m·x) is from 2 to about 300, and $R_1$ is a member of the group consisting of

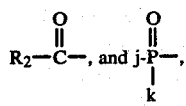

and sulfonates and sulfates of each of the members of said group, wherein $R_2$ is H, OH, an alkyl radical containing up to about 20 carbon atoms or alkyl substituted carbonyl radical containing up to about 20 carbon atoms, j and k are OH, OM or $OR_3$ wherein M is a cation moiety of an alkali metal, an alkaline earth metal or ammonium, and $R_3$ is an alkyl radical containing up to about 20 carbon atoms.

Preferred among the compounds of the above formula are those where A, the linking moiety of the organic dyestuff molecule, is an amino nitrogen. Compounds contemplated within this general class are those wherein the organic dyestuff molecule is a nitroso, nitro, azo, including monoazo, diazo and trisazo, diphenylmethane, triphenylmethane, xanthene, acridene, methine, thiazole, indamine, azine, oxazine, or anthraquinone dyestuff radicals. Preferred dyestuff constituents are the azo and triphenylmethane dyestuffs.

The fugitive tints of the present invention may be prepared by converting a dyestuff intermediate into a corresponding alkyleneoxide containing compound, capping the alkylene oxide containing compound with an alkyl anhydride, a carboxylic acid, phosphoric compounds such as phosphorus oxychloride, phosphoric acid complexes, sulfur containing compounds such as $SO_3$, alkyl and aryl sulfonyl chlorides, sulfuric acid complexes, etherifying agents such as alkyl halides, alkyl sulfates, alkyl phosphates and the like, as hereinbefore defined, and thereafter employing the resulting capped alkylene oxide containing intermediate to react with a compound having a chromophoric group in the molecule to produce the desired fugitive tint composition. The method of producing the dyestuff intermediate containing the alkylene oxide constituent can be any suitable manner such as disclosed in U.S. Pat. No. 3,157,633 or 3,927,044, each incorporated herein by reference. Once the desired alkylene oxide containing intermediate has been formed, such is capped to provide the intermediate for preparation of the novel fugitive tint compositions of the present invention.

As previously stated, the solubility and thus fugitivity characteristics of the novel tint compositions of the present invention can readily be varied by the formulation by preselecting the particular capping moiety employed in such tint compositions, the presence or absence of an ionic group or moiety in the tint molecule, and the total number of alkylene oxide units in the tint molecule. To illustrate such varying solubility and fugitive characteristics the following is set forth.

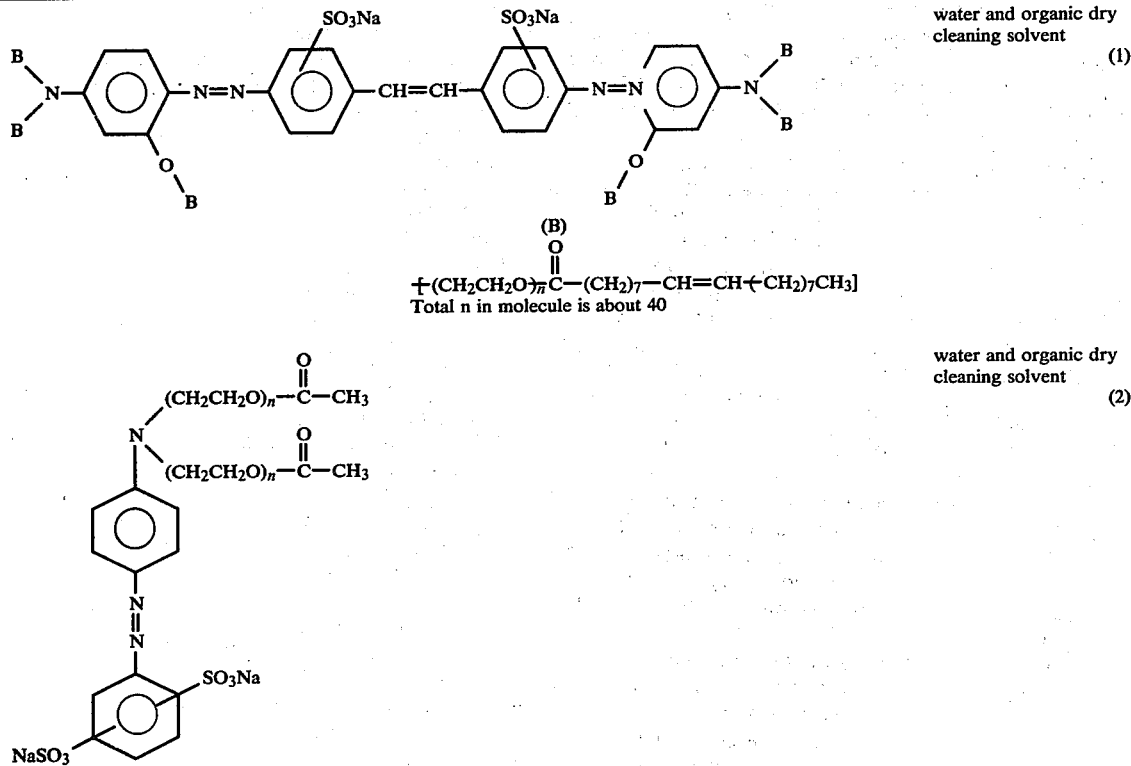

| Tint Structure | Capping Moiety Solubility & Fugitivity Characteristics |
|---|---|
| Structure with N-linked bis[(CH$_2$CH$_2$O)$_n$P(=O)(OH)$_2$] groups on phenyl-N=N-phenyl(SO$_3$Na)(NaSO$_3$); capping moiety: $-\text{P}(=O)(\text{OH})(\text{OH})$; total n in molecule is about 20 | water (3) |
| Structure with N-linked bis[(CH$_2$CH$_2$O)$_n$C(=O)-CH$_2$-CH(SO$_3^{\ominus}\text{Na}^{\oplus})-C(=O)-OH] groups on phenyl-N=N-phenyl(SO$_3$Na)(NaSO$_3$); capping moiety: $-\text{C}(=O)-\text{CH}_2-\text{CH}(\text{SO}_3^{\ominus}\text{Na}^{\oplus})-\text{C}(=O)-\text{OH}$; total n in molecule is about 100. | water (4) |
| Structure with N-linked bis[(CH$_2$CH$_2$O)$_n$-C(=O)-(CH$_2$)$_{10}$-CH$_3$] groups on phenyl-N=N-phenyl(SO$_3$Na)(NaSO$_3$) | water and organic dry cleaning solvent (5) |

| Tint Structure | Capping Moiety Solubility & Fugitivity Characteristics |
|---|---|

-continued

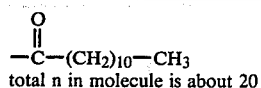
total n in molecule is about 20

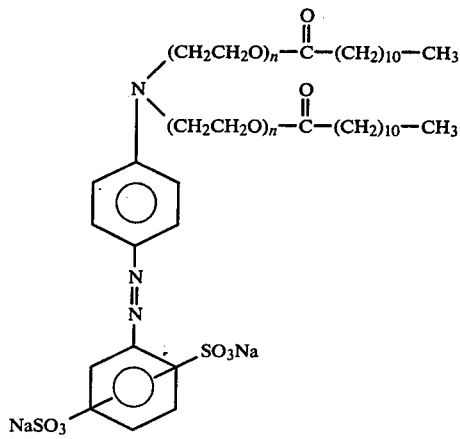

water and organic dry cleaning solvent (6)

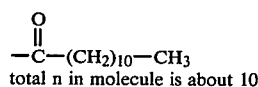
total n in molecule is about 10

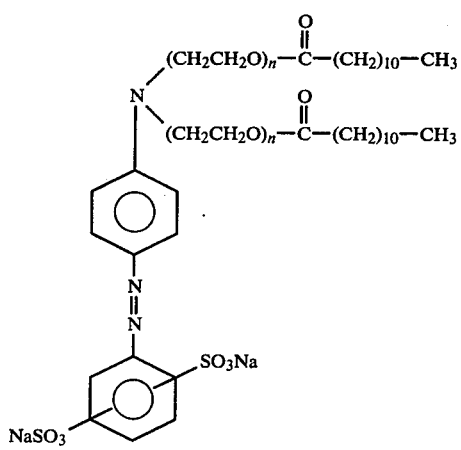

water and organic dry cleaning solvent (7)

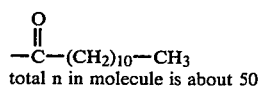
total n in molecule is about 50

As previously stated, the fugitive tint compositions of the present invention contain an organic dyestuff molecule designated in the before-described general formula as RA where R is the color producing chromophore moiety and A is a linking moiety. Further, as previously stated, the organic dyestuff molecule can be any suitable molecule provided such molecule contains a linking moiety of N, O, S, or $CO_2$. To illustrate the organic dyestuff molecule, including the linking moiety, of the fugitive tint compositions of the present invention the following examples are set forth. However, it is to be understood that such are for illustrative purposes only and are not to be construed as depicting or limiting the organic dyestuff molecules useful in the tint compositions of the present invention.

Typical Dyestuff Molecules Containing Linking Moieties

-continued
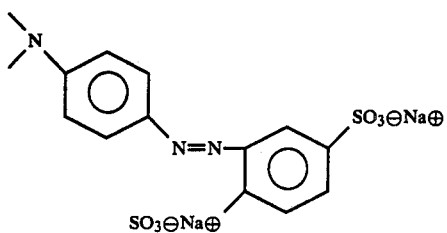
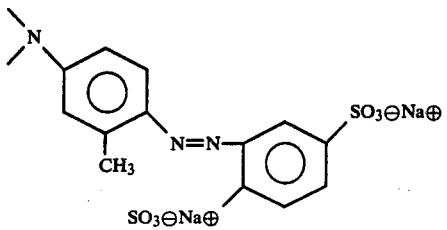
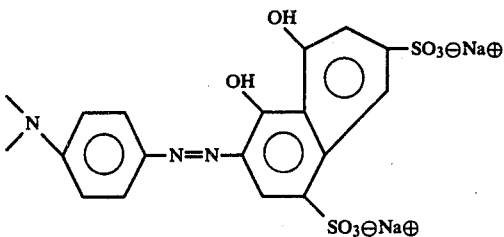
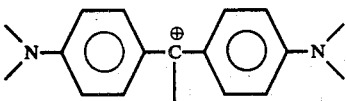
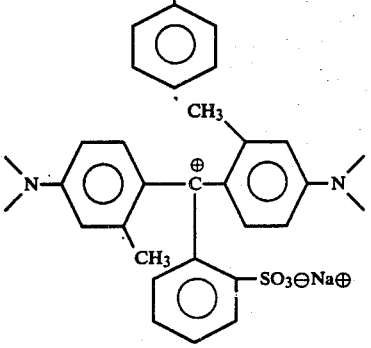
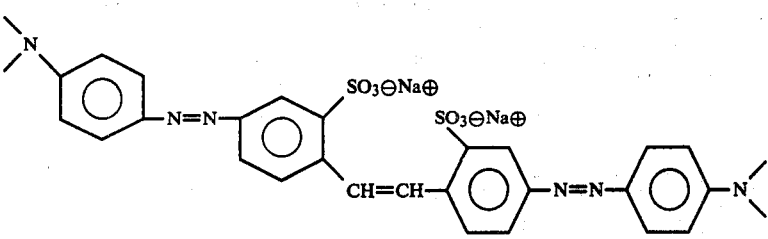
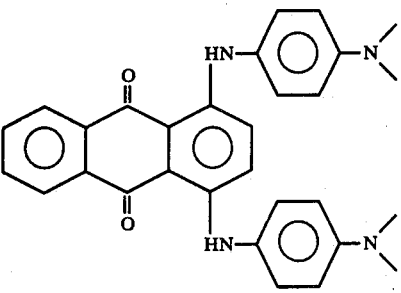

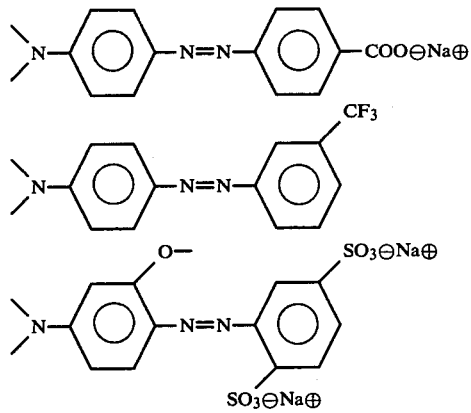

The following examples are given to illustrate the preparation and use of novel fugitive tint compositions of the present invention. However, it is to be understood that such examples are for illustrative purposes only and are not to be construed as unduly limiting the scope of the present invention.

EXAMPLE I

A dye intermediate was prepared by bubbling ethylene oxide into molten m-aminophenol at 150° C. and 50 psig until two molar equivalents of ethylene oxide have been absorbed. There was thus produced N,N,-dihydroxy ethyl-aminophenol. Two grams of potassium hydroxide was then added to the above-identified product followed by 18 moles of ethylene oxide, such resulting in a total of 1,000 grams of a 20 molar m-aminophenol product having the formula

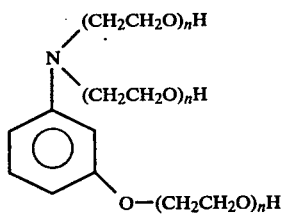

wherein the total sum of n in the molecule is about 20.

The m-aminophenol product thus described was then reacted with 1,480 grams of oleic acid in the presence of 10 grams hydrophosphorous acid, a catalyst and color stabilizer. The resulting mixture was then heated to 220° C. and reacted until approximately 50 grams of water had been removed, such indicating complete esterification of the m-aminophenol product. The capped or esterified product was then stripped, under vacuum, to remove excess free acid. The product, so produced, had the following structural formula and is representative of the capped intermediate compositions employed to produce the improved fugitive tint compositions of the present invention.

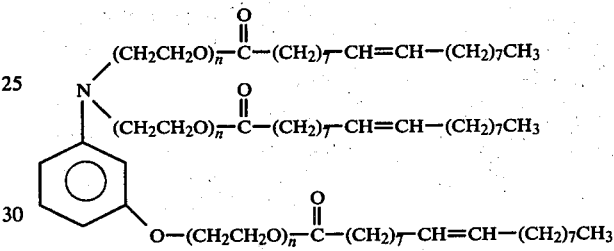

wherein the total sum of n in the molecule is about 20.

To 369 grams of the above-identified capped intermediate was added 300 grams of water and 54.6 grams of 4,4'-diaminostilbene 2,2'-disulfonic acid. The resulting mixture was stirred until a homogeneous solution was formed. The pH of the homogeneous solution was adjusted to 4.0±0.5 with HCl and a solution of 28 grams of 1 mole sodium nitrite and 75 grams of water was added slowly, while maintaining the pH of the homogeneous solution at 4.0±0.5 by the addition of the required amount of HCl. Immediately upon the addition of the sodium nitrite solution the 4,4'-diaminostilbene-2,2'-disulfonic acid was diazotized and coupled to the intermediate, e.g., the before-mentioned esterification product. The material was then allowed to post react for 1½ hours and the pH of the reactant mixture was brought to neutral with a 50% sodium hydroxide solution. A red-orange tint was formed and was found to have the following structure:

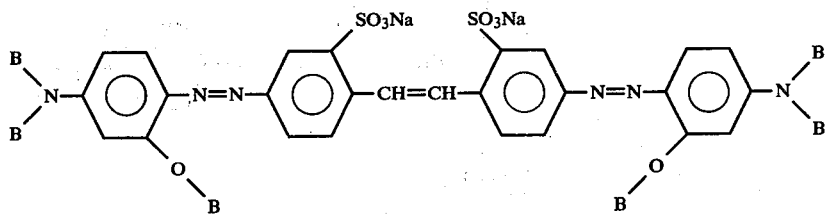

wherein each B is the radical

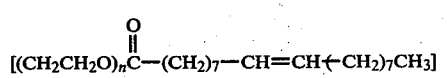

and the total sum of n in the molecule is about 40.

The tint so formed was applied to 100% polyester fabric and heat set at 230° F. for 30 minutes. The tint was substantially removed by washing the tinted fabric with water or a dry cleaning solvent. The tint in its aqueous medium was soluble in H$_2$O or perchloroethylene.

EXAMPLE II

One hundred five grams of acetic anhydride was admixed with 500 grams of an adduct of aniline containing 20 moles of ethylene oxide (a tint intermediate) at 85° C. The resulting mixture was post reacted 30 minutes and the product was analyzed for completion by determining the hydroxyl number and the acid number. The product, and anhydride capped tint intermediate had the following structure:

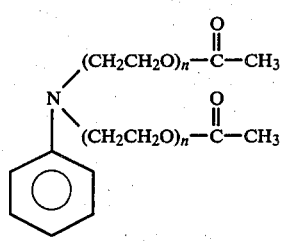

wherein the total of n in the molecule was about 20.

To 300g of the capped intermediate was added 150g of water and 80g of aniline 2,5-disulfonic acid 89.8% purity. The resulting mixture was stirred until a homogeneous solution was formed. The pH of the solution was adjusted to 2.0±0.5 with HCl and a solution of 17.5g sodium nitrite and 50g of water was added slowly, while maintaining the pH of the homogeneous solution at 2.0±0.5 by the addition of the required amount of HCl. Immediately upon the addition of the sodium nitrite solution, the aniline 2,5-disulfonic acid was diazotized and coupled to the intermediate, e.g., the beforementioned esterification product. The material was allowed to post react 2.5 hours and the pH of the reactant mixture was brought to neutral with 50% sodium hydroxide solution. A yellow-orange tint was formed and was found to have the following structure:

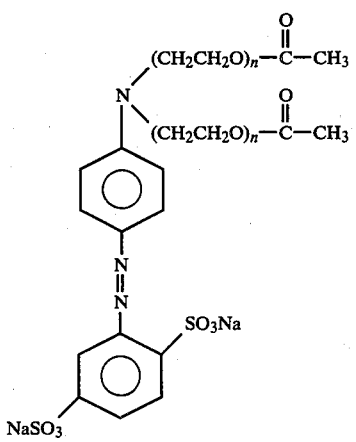

wherein the total of n in the molecule was about 20.

The tint so formed was applied to nylon 6 fabric and heat set at 270° F. for about 30 minutes. A polyethoxy homolog tint was also applied to nylon 6 fabric and heat set at 270° F. for about 30 minutes. The fugitivity of the acetic anhydride capped tint was improved over the polyethoxy homolog tint. Further, the capped tint was fugitive in either water or an organic dry cleaning solvent.

EXAMPLE III

Three hundred twenty-five grams of an adduct of aniline containing 100 moles of ethylene oxide was charged into a round bottom flask equipped with a stirrer, condenser, nitrogen sparge and pot thermometer. The adduct was heated to 50° C. and thereafter 25 grams of POCl$_3$ (phosphorous oxychloride) was added slowly to the adduct. A rise in temperature of the resulting reaction mixture was noted indicating that the reaction was occurring. After the phosphorous oxychloride was in the reaction mixture, the resulting mixture was post reacted for 30 minutes. Thereafter, the reaction product was heated to 100° C. and vacuum stripped at approximately 35 MM mercury to remove the hydrogen chloride that had formed. The two remaining chlorine groups were then hydrolized by the addition of 202 grams of water. The reaction completion was determined by hydroxyl number and acid number. The product, a phosphate capped product, was found to have the following structure:

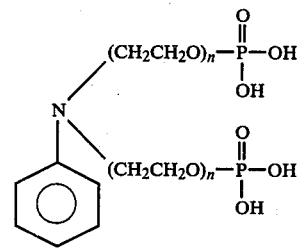

wherein the total of n in the molecule is about 100.

To 300g of the capped intermediate was added 5.8g of aniline-2,5-disulfonic acid, 88%. The resulting mixture was stirred until a homogeneous solution was formed. The pH of the solution was adjusted to 2.0±0.5 with HCl and a solution of 1.3g sodium nitrite and 10g water was added slowly, while maintaining the pH of the homogeneous solution at 2.0±0.5 by the addition of the required amount of HCl. Immediately upon the addition of the sodium nitrite solution the aniline-2,5-disulfonic acid was diazotized and coupled to the intermediate, e.g., the before-mentioned esterification product. The material was allowed to post react 3 hours and the pH of the reactant mixture was brought to neutral with 50% sodium hydroxide solution. A yellow-orange tint was formed and found to have the following structure:

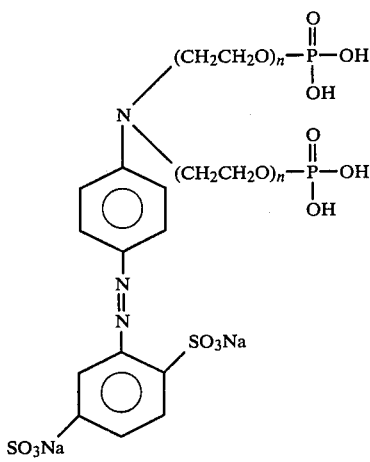

EXAMPLE IV

Five hundred fifty grams of an adduct of aniline containing 200 moles of ethylene oxide were charged to a 2 liter round bottom flask equipped with a stirrer, nitrogen sparge, and condenser. The adduct was heated to 75° C. and thereafter 2.5 grams of potassium hydroxide catalyst was added. 12.5 grams of maleic anhydride was then added to the catalized adduct, slowly, under a nitrogen atmosphere. A temperature rise in the reaction mixture to 100° C. was detected and thereafter the reaction mixture was post reacted for 1½ hours to ensure completion of the reaction between the maleic anhydride and the adduct. Thereafter, 15.7 grams of Na$_2$SO$_3$ (sodium sulfite) which had previously been dissolved in 225 grams of water was added dropwise to the reaction mixture while the mixture was at a temperature of about 75° C. to about 80° C. After the aqueous solution of the sodium sulfite had been added, an additional 225 grams of water was also added. The reaction completion was determined by the acid number. The product, a capped dye intermediate, had the following structure:

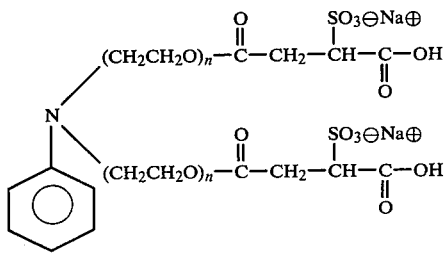

wherein the total of n in the molecule is about 100.

To 110g of the capped intermediate was added 3.8g of aniline-2,5-disulfonic acid, 89.9%. The resulting mixture was stirred until a homogeneous solution was formed. The pH of the solution was adjusted to 2.0±0.5 with HCl and a solution of 0.9% sodium nitrite and 20g H$_2$O was added slowly, while maintaining the pH of the homogeneous solution at 2.0±0.5 by the addition of the required amount of HCl. Immediately upon the addition of the sodium nitrite solution the aniline-2,5-disulfonic acid was diazotized and coupled to the intermediate, e.g., the before-mentioned esterification product. The material was allowed to post react 2.5 hours and the pH of the reactant mixture was brought to neutral with 50% sodium hydroxide solution. A yellow-orange tint was formed and found to have the following structure:

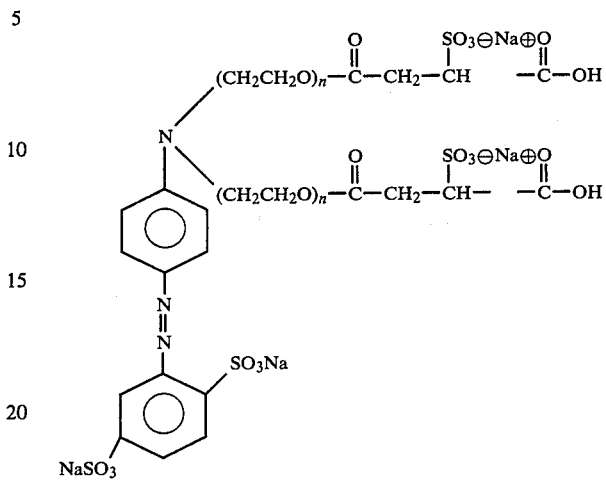

wherein the total of n in the molecule is about 100.

The tint so formed was applied to nylon 6 fabric and heat set at 270° F. for about 30 minutes. A 200 molar polyethoxy homolog tint was also applied to nylon 6 fabric and heat set at 270° F. for 30 minutes. The heat set tinted fabrics were then rinsed with water and it was determined that the fugitivity of the sulfosuccinate tint was greatly improved over the conventional 200 molar polyethoxy homolog tint.

EXAMPLE V

Two moles of an adduct of aniline containing 20 moles of ethylene oxide was charged into a round bottom flask. Four moles of lauric acid and 0.15 moles hypophosphorous acid were then added slowly and the mixture was heated to 220° C. Utilizing a Dean-Stark trap, the water was removed as it was formed. The reaction was allowed to continue for 12 hours, after which the residual water was stripped at 220° C., and acid number and hydroxyl number were checked to insure reaction completion.

To 150g of this tint intermediate (100%) was then charged 300g water and 33.5g aniline-2,5-disulfonic acid, 89.8% purity. The pH was adjusted to 2.0±0.5 with HCl, and a solution of 15g sodium nitrite in 25g H$_2$O was added dropwise to effect the diazotization and subsequent coupling reactions. A 2.5 hour post stir period was necessary to insure complete reaction, and a pH of 2.0±0.5 was maintained throughout the nitrite addition and stir period. The pH was then adjusted to 7.0±0.5 with 50% NaOH. The tint produced had the following structure:

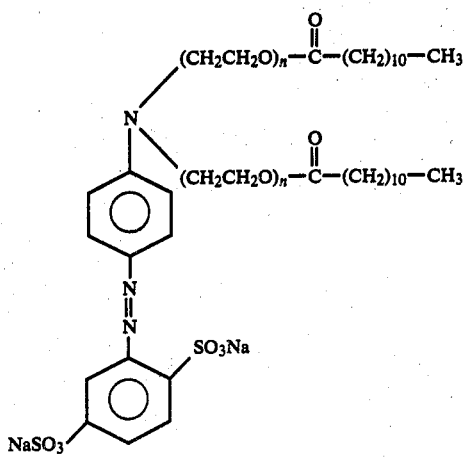

where the total of n in the molecule was about 20. The tint as produced was an aqueous admixture containing about 31 weight percent of the solid tint. The aqueous tint containing admixture was allowed to stand at room temperature in an unsealed container until a substantial portion of the water had evaporated. The resulting product, a pasty liquid was soluble in both water and perchloroethylene. A sample of the aqueous admixture was dried at a temperature of 100° C. in an oven overnight. The substantially dry tint was then tested for solubility in water and perchloroethylene. The dried tint was found to be soluble in water but was substantially insoluble in the perchloroethylene.

EXAMPLE VI

One mole of an adduct of aniline containing 10 moles of ethylene oxide was reacted with 2 moles lauric acid as in Example V, except that the aniline-adduct-lauric acid mixture was heated to 150° C. This capped tint intermediate (100%) was then mixed with 49g of aniline-2,5-disulfonic acid of 89.9% purity, using 50g MeOH as the solvent. The pH was adjusted and maintaied at 2.0±0.5 with HCl. Eleven grams of sodium nitrite was dissolved in 25g H$_2$O and 25g MeOH, and the solution was added slowly to avoid foaming. The pH was kept at 2.0 during a 2.5 hour stir period, after which 50% NaOH was used to adjust the pH to 7.0±0.5. The tint produced had the following structure:

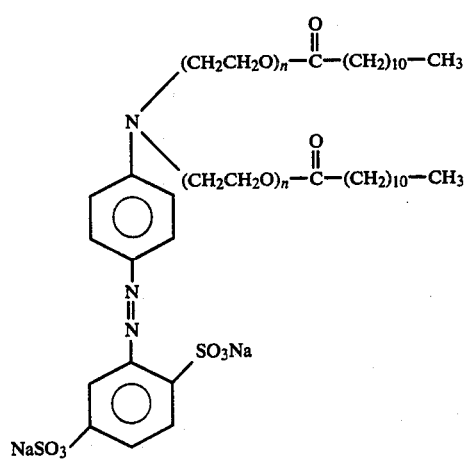

where the total of n in the molecule was about 10.

The tint as produced was an aqueous admixture containing about 9.6 weight percent of the solid tint. A sample of the aqueous admixture was dried at a temperature of 100° C. in an oven overnight. The dried tint was then tested for solubility in water and perchloroethylene. The dried tint was found to be soluble in both water and perchloroethylene.

EXAMPLE VII

One mole of an adduct of aniline containing 50 moles of ethylene oxide was reacted with 2 moles of lauric acid as in Example V. To 462 grams of this capped tint intermediate (65%) was added 100 grams H$_2$O and 35 grams aniline-2,5-disulfonic acid of 89.89c purity. The pH was adjusted to 2.0±0.5 and a solution of 8 grams sodium nitrite in 25 grams H$_2$O was added slowly (to prevent foaming). During the addition and subsequent 2.5 hour post stir period, the low pH was maintained with HCl. When the reaction was complete, 50% NaOH was used to raise the pH to 7.0±0.5. The tint produced has the following structure:

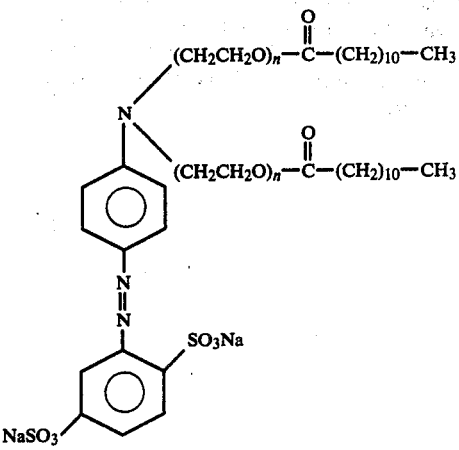

where the total of n in the molecule is about 50.

The tint as produced was an aqueous admixture containing about 55 weight percent of the solid tint. A sample of the aqueous admixture was dried at a temperature of 100° C. in an oven overnight. The dried tint was then tested for solubility in water and perchloroethylene. The dried tint was found to be soluble in both water and perchloroethylene.

Additional capping reactions of the alkoxy constituent of a dye intermediate can be employed to provide the capped intermediates for the formation of the improved fugitive dyes of the present invention. The particular selection of the organic compound employed to cap the alkoxy constituent can vary widely. However, as previously stated, the capping constituent is selected from the group consisting of

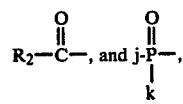

sulfonates and sulfates of each of the members of the capping constituent, wherein R$_2$ is H, OH, an alkyl radical or alkyl substituted carbonyl radical containing up to about 20 carbon atoms, j and k are OH, OM or $OR_3$ wherein M is a cation moiety of an alkali metal, an alkaline earth metal or ammonium, and $R_3$ is an alkyl radical containing up to 20 carbon atoms.

The above compounds can be converted into the improved fugitive tints of this invention according to the procedure described in the examples.

Having thus described the invention, I claim:

1. A fugitive tint characterized by the formula $$R\{A-(\text{alkyleneoxy})_n R_1]_m\}_x$$

wherein RA is an organic dyestuff radical, A is N, O, S or $CO_2$; the alkyleneoxy contains from 2 to 4 carbon atoms, n is an integer of from 2 to 300; m is 1 when A is O, S, or $CO_2$ and 2 when A is N; x is an integer of from 1 to 5, and the product of n times x times m is from 2 to 300; $R_1$ is

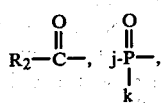

sulfonates and sulfates thereof, $R_2$ is H, OH or alkyl containing up to 20 carbon atoms, j and k are OH, OM, or $OR_3$ wherein M is alkali metal, an alkaline earth metal or ammonia, and $R_3$ is alkyl containing up to 20 carbon atoms.

2. The fugitive tint of claim 1 wherein said alkylene constituent is selected from the group consisting of ethylene oxide, propylene oxide and copolymers thereof.

3. The fugitive tint of claim 2 wherein said alkyleneoxy constituent is a copolymer of ethylene oxide and propylene oxide and said ethylene oxide comprises from about 25 to about 75 percent of said copolymer.

4. The fugitive tint of claim 1 wherein A is N, said alkylene constituent is ethyleneoxy and said $R_1$ is

5. The fugitive tint of claim 4 wherein said $R_1$ is a sulfonate of

6. The fugitive tint of claim 5 wherein said $R_1$ is

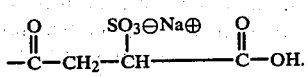

* * * * *